(12) United States Patent
Wynn et al.

(10) Patent No.: US 8,771,637 B2
(45) Date of Patent: Jul. 8, 2014

(54) GAS SEPARATION PROCESS FOR PRODUCTION OF HYDROGEN BY AUTOTHERMAL REFORMING OF NATURAL GAS, WITH CARBON DIOXIDE RECOVERY

(75) Inventors: Nicholas P. Wynn, Redwood City, CA (US); Douglas E Gottschlich, Redwood City, CA (US); Haiqing Lin, Mountain View, CA (US)

(73) Assignee: Membrane Technology and Research, Inc., Newark, CA (US)

( * ) Notice: Subject to any disclaimer, the term of this patent is extended or adjusted under 35 U.S.C. 154(b) by 146 days.

(21) Appl. No.: 13/370,942

(22) Filed: Feb. 10, 2012

(65) Prior Publication Data

US 2012/0141367 A1 Jun. 7, 2012

(51) Int. Cl.
*C01B 3/24* (2006.01)
*C01B 3/26* (2006.01)
*C01B 31/20* (2006.01)

(52) U.S. Cl.
USPC .................. 423/650; 423/437.1; 423/652

(58) Field of Classification Search
USPC ....................... 423/437.1, 650, 652
See application file for complete search history.

(56) References Cited

U.S. PATENT DOCUMENTS

| 4,963,165 | A | 10/1990 | Blume et al. | |
|---|---|---|---|---|
| 6,572,837 | B1 * | 6/2003 | Holland et al. | 423/648.1 |
| 8,460,630 | B2 * | 6/2013 | Niitsuma et al. | 423/437.1 |
| 2010/0260657 | A1 * | 10/2010 | Niitsuma et al. | 423/437.1 |

FOREIGN PATENT DOCUMENTS

| EP | 2 141 119 A1 | 1/2010 |
|---|---|---|
| EP | 2 181 962 A1 | 5/2010 |

OTHER PUBLICATIONS

K. O'Brien et al. "Fabrication and Scale-Up of PBI-based Membrane System for Pre-Combustion Capture of Carbon Dioxide," DOE NETL Project Fact Sheet, 2009.
B. T. Low et al., "Simultaneous Occurrence of Chemical Grafting, Cross-linking, and Etching on the Surface of Polyimide Membranes and Their Impact on H2/CO2 Separation," Macromolecules, vol. 41, No. 4, pp. 1297-1309, 2008.
Lin et al., "Materials selection guidelines for membranes that remove CO2 from gas mixtures," J. Mol. Struct., 739, 57-75, 2005.
Lin et al., "Plastization-Enhanced Hydrogen Purification Using Polymeric Membranes," Science, 311, 639-642, 2006.

* cited by examiner

*Primary Examiner* — Wayne Langel
(74) *Attorney, Agent, or Firm* — J. Farrant; T. Hott

(57) ABSTRACT

Disclosed herein is a process for the production of hydrogen by autothermal reforming of natural gas, with simultaneous recovery of carbon dioxide using carbon dioxide-selective membrane separation. Residual gas from the hydrogen and carbon dioxide recovery is recycled back to the autothermal reformer.

20 Claims, 6 Drawing Sheets

(not in accordance with invention)

GAS SEPARATION PROCESS FOR PRODUCTION OF HYDROGEN BY AUTOTHERMAL REFORMING OF NATURAL GAS, WITH CARBON DIOXIDE RECOVERY

FIELD OF THE INVENTION

The invention relates to a gas separation process for the production of hydrogen by autothermal reforming of natural gas, where the hydrogen removal step is followed by a membrane-based carbon dioxide separation step. Residual gas from the membrane separation step is recycled back to the autothermal reformer.

BACKGROUND OF THE INVENTION

Methane reforming is a chemical process that results in the production of pure hydrogen from natural gas. There are two basic types of natural gas reforming technologies: steam methane reforming (SMR) and autothermal reforming (ATR). Both methods work by exposing natural gas and steam to a catalyst (typically nickel) at high temperature.

Conventional steam methane reforming (SMR) uses an external source of hot gas to heated tubes in which a catalytic reaction takes place that converts steam and lighter hydrocarbons—such as natural gas or refinery feedstock—into hydrogen and carbon oxides (i.e., syngas).

During a conventional SMR process, the following two reactions take place concurrently:

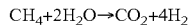
$$CH_4 + 2H_2O \rightarrow CO_2 + 4H_2$$

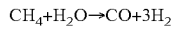
$$CH_4 + H_2O \rightarrow CO + 3H_2$$

A water-gas shift reaction is then performed using steam to convert carbon monoxide to carbon dioxide and generate additional hydrogen. This is typically followed by a pressure-swing adsorption (PSA) step to purify the hydrogen.

Because the above two reactions are both endothermic, residual, unreacted tail gas from the PSA process is not wasted, but finds a ready use to heat the reformer to drive the reaction.

In autothermal reforming (ATR), oxygen is added to the process, resulting in the additional reactions:

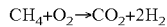
$$CH_4 + O_2 \rightarrow CO_2 + 2H_2$$

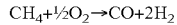
$$CH_4 + \tfrac{1}{2}O_2 \rightarrow CO + 2H_2$$

The above reactions are exothermic and—provided that enough oxygen is added to balance the two endothermic reactions out—can result in an overall adiabatic process. Therefore, no additional heat source is needed. Although requiring oxygen feed, the ATR has the advantage that it is more compact and less expensive to build than the SMR, because the heat transfer surface required is considerably less with an adiabatic process.

A basic process schematic for a conventional ATR process is shown in FIG. 1. According to this process, natural gas, 101, steam, 102, and oxygen, 103, are introduced into an autothermal reformer, 104. The resulting gas, 105, comprising carbon dioxide, carbon monoxide, hydrogen, unreacted natural gas and excess steam, is cooled and sent to a shift reactor, 107. The shift reaction is performed through the addition of steam, 106, to convert the carbon monoxide to carbon dioxide. The resulting gas mixture, 108, is cooled in step, 109, to condense out water, 110. The resultant gas mixture, 111, is passed to a hydrogen separation unit, 112 (typically, a pressure swing adsorption unit) to separate hydrogen, 113. Tail gas, 114, contains mostly carbon dioxide, together with some carbon monoxide, hydrogen, inerts, and unreacted methane.

Tail gas from the ATR process described above is not pure carbon dioxide, so if it is desirable to recover and/or capture carbon dioxide for sequestration or some other purpose, the tail gas stream needs to be purified. Not only does the carbon dioxide have to be purified, but the impurities should be recovered in fairly concentrated form to minimize carbon dioxide loss, i.e., maximize carbon dioxide recovery.

The process of the subject invention achieves this objective in a different, more efficient way. By using the process of the invention, substantially all of the carbon dioxide is recovered; losses of methane and carbon monoxide are minimized; and steam consumption in the reformer is drastically reduced.

SUMMARY OF THE INVENTION

The invention is a gas separation process for the production of hydrogen by autothermal reforming of natural gas, where the hydrogen removal step is followed by or preceded by a membrane-based carbon dioxide separation step. Residual gas from these separation steps is recycled back to the autothermal reformer.

A basic embodiment of the process of the invention comprises the following steps:

(a) introducing natural gas, steam, and oxygen into an autothermal reformer, to produce a gas mixture comprising carbon dioxide, carbon monoxide, hydrogen, water vapor, and residual natural gas;

(b) cooling the gas mixture to condense out water;

(c) treating the resultant gas mixture to remove hydrogen, to produce a hydrogen product stream and a hydrogen-depleted gas mixture;

(d) providing a membrane having a feed side and a permeate side, wherein the membrane is selective to carbon dioxide over hydrogen;

(e) passing the hydrogen-depleted gas mixture across the feed side;

(f) withdrawing from the permeate side a permeate stream that is enriched in carbon dioxide relative to the hydrogen-depleted gas mixture;

(g) withdrawing from the feed side a residue stream that is depleted in carbon dioxide relative to the hydrogen-depleted gas mixture; and (h) passing the residue stream as a recycle stream back to the autothermal reformer.

The residue stream is typically treated to remove nitrogen, argon, and other inerts prior to being passed as a recycle stream back to the reformer in step (h).

The process produces a hydrogen product stream as well as a hydrogen-depleted gas mixture. The hydrogen-depleted gas mixture may be compressed and condensed to produce high-purity carbon dioxide prior to being passed across the feed side of the membrane. Alternatively, the carbon dioxide-enriched permeate stream may be compressed and condensed to produce high-purity carbon dioxide.

In an alternative embodiment of the inventive process, carbon dioxide is removed from the gas mixture first, followed by a hydrogen removal step. A basic embodiment of this process comprises the following steps:

(a) introducing natural gas, steam, and oxygen into an autothermal reformer, to produce a gas mixture comprising carbon dioxide, carbon monoxide, hydrogen, water vapor, and residual natural gas;

(b) cooling the gas mixture to condense out water;

(c) providing a membrane having a reed side and a permeate side, wherein the membrane is selective to carbon dioxide over hydrogen;

(d) passing the gas mixture across the feed side;

(e) withdrawing from the penneate side a permeate stream that is enriched in carbon dioxide relative to the gas mixture;

(f) withdrawing from the feed side a residue stream that is depleted in carbon dioxide relative to the gas mixture;

(g) treating the residue stream to remove hydrogen, to produce a hydrogen product stream and a hydrogen-depleted gas stream; and (h) passing the hydrogen-depleted gas stream as a recycle stream back to the autothermal reformer.

The hydrogen-depleted gas stream is typically treated to remove nitrogen, argon, and other inerts prior to being passed as a recycle stream back to the reformer in step (h).

The gas mixture may be compressed and condensed to produce high-purity carbon dioxide prior to being passed across the feed side of the membrane. Alternatively, the carbon dioxide-enriched permeate stream may be compressed and condensed to produce high-purity carbon dioxide.

In either of the above process embodiments, the hydrogen removal step is typically a pressure swing adsorption (PSA) step, but a hydrogen-permeable membrane with good hydrogen/carbon dioxide selectivity can also be used, as may any other technology capable of adequate separation of hydrogen from carbon dioxide.

The membrane to recover carbon dioxide typically has a selectivity to carbon dioxide over hydrogen of at least 6 and a carbon dioxide permeance of at least about 200 gpu. Preferably, the membrane has a selectivity to carbon dioxide over hydrogen of at least 8, more preferably, at least 10, and a carbon dioxide permeance of at least about 400 gpu.

Condensation of carbon dioxide may be combined with membrane separation to enhance the purity of the recovered carbon dioxide.

The process of the invention results in the production of at least 20% more hydrogen than a conventional autothermal reforming process.

The invention is applicable to any process that produces hydrogen from hydrocarbon/carbon feedstock using steam and oxygen and where carbon dioxide recovery is desired. The inventive process has a number of advantages over conventional ATR processes, including:

Because residual carbon monoxide is not lost to the process, no shift reactor, and consequently, no steam supply, are necessary.

Because residual methane is not lost to the process, not all natural gas need be reacted per pass; as such, the autothermal reactor can be operated with less steam and can be smaller.

Because residual carbon dioxide is not lost to the process, not all carbon dioxide needs to be recovered per pass; as such, carbon dioxide recovery can be performed at higher carbon dioxide partial pressure, reducing membrane area and maximizing carbon dioxide purity by minimizing co-permeation of other components.

Because residual hydrogen is not lost to the process, hydrogen yield is maximized.

DETAILED DESCRIPTION OF THE INVENTION

Figure 1:
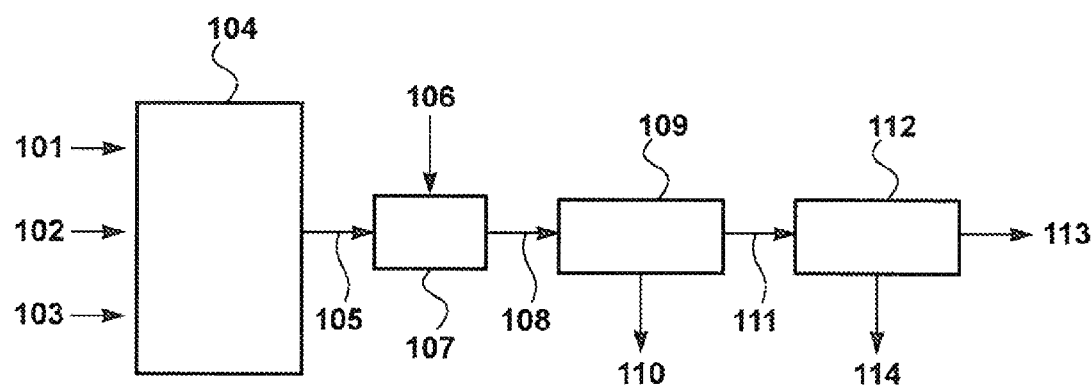
FIG. 1 is a basic process schematic for a conventional ATR process (not in accordance with the invention).
Figure 2:
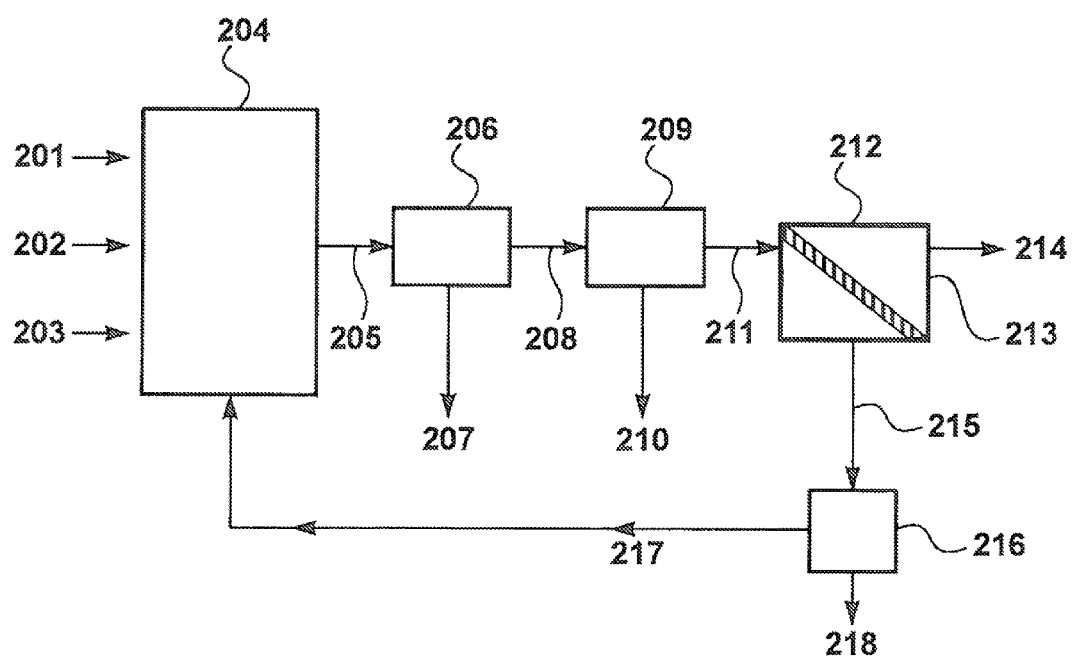
FIG. 2 is a basic process schematic for an ATR process in accordance with the invention, which includes a hydrogen removal step followed by a membrane-based carbon dioxide recovery step, with recycle of the membrane residue back to the autothermal reformer.

A basic process schematic for an ATR process in accordance with the invention, which includes a membrane-based carbon dioxide separation step and recycle of the membrane residue back to the autothermal reformer, is shown in FIG. 2. It will be appreciated by those of skill in the art that this, like FIG. 1, is a very simple block diagram, intended to make clear the key unit operations of the process of the invention, and that an actual process train will usually include many additional steps of a standard type, such as heating, chilling, compressing, condensing, pumping, various types of separation and/or fractionation, as well as monitoring of pressures, temperatures, flows, and the like. It will also be appreciated by those of skill in the art that the details of the unit operations may differ from product to product.

Referring to the figure, natural gas, 201, steam, 202, and oxygen, 203, are introduced into an autothermal reformer, 204. The resulting gas, 205, comprising carbon dioxide, carbon monoxide, hydrogen, water vapor, and residual inerts is cooled in step, 206, to condense water, 207. The resulting gas mixture, 208, is passed to a hydrogen separation unit, 209, to separate hydrogen, 210, to produce a hydrogen product stream.

The hydrogen separation unit 209 is typically a pressure swing adsorption (PSA) unit, but a hydrogen-permeable membrane with good hydrogen/carbon dioxide selectivity can also be used, as may any other technology capable of adequate separation of hydrogen from carbon dioxide.

PSA is a technology that operates at near-ambient temperatures to separate certain gas species from a mixture of gases under pressure, according to the species' molecular characteristics and affinity for an adsorbent material. Special adsorptive materials are used as a molecular sieve, preferentially adsorbing the target gas species at high pressure. Aside from their ability to discriminate between different gases, adsorbents for PSA systems are usually very porous materials chosen because of their large surface areas. Typical adsorbents are activated carbon, silica gel, alumina, and zeolite. Following adsorption, the process swings to low pressure to release ("desorb") the adsorbed material.

As stated above, hydrogen-permeable membranes with good hydrogen/carbon dioxide selectivity can alternatively be used. Preferred hydrogen-selective membranes for use in the process of the invention typically comprise organic polymeric materials. Any organic polymer membrane with suitable performance properties may be used. Examples of such membranes include the polybenzimidazole (PBI) based membranes taught by K. O'Brien et al. in "Fabrication and Scale-Up of PBI-based Membrane System for Pre-Combustion Capture of Carbon Dioxide" (DOE NETL Project Fact Sheet 2009) and polyimide-based membranes taught by B. T. Low et al. in "Simultaneous Occurrence of Chemical Grafting, Cross-linking, and Etching on the Surface of Polyimide Membranes and Their Impact on $H_2/CO_2$ Separation" (*Macromolecules*, Vol. 41, No. 4, pp. 1297-1309, 2008).

Preferred hydrogen-selective membrane materials include polyimides, polyamides, polyurethanes, polyureas, polybenzimidazoles, and polybenzoxazoles, by way of example and not by way of limitation.

Hydrogen-depleted gas, 211, from the hydrogen separation unit is then passed to a membrane separation unit, 212, that contains membranes, 213, that are selective to carbon dioxide over hydrogen, carbon monoxide, and methane. Typically, the membranes have a selectivity to carbon dioxide over hydrogen of at least 6 and a carbon dioxide permeance of at least about 200 gpu. Preferably, the membranes have a selectivity to carbon dioxide over hydrogen of at least 8, more preferably, at least 10, and a carbon dioxide permeance of at least about 400 gpu.

Any membrane with suitable performance properties may be used. Many polymeric materials, especially elastomeric materials, are very permeable to carbon dioxide. Such polymeric materials are described, for example, in two publications by Lin et al., "Materials selection guidelines for membranes that remove $CO_2$ from gas mixtures" (*J. Mol. Struct.*, 739, 57-75, 2005) and "Plastization-Enhanced Hydrogen Purification Using Polymeric Membranes" (*Science,* 311, 639-642, 2006).

Preferred membranes for separating carbon dioxide from other gases often have a selective layer based on a polyether. Not many membranes are known to have high carbon dioxide/hydrogen selectivity. A representative preferred material for the selective layer is Pebax®, a polyamide-polyether block copolymer material described in detail in U.S. Pat. No. 4,963, 165. We have found that membranes using Pebax® as the selective polymer can maintain a selectivity of 9, 10, or greater under process conditions.

The preferred form is a composite membrane. Modern composite membranes typically comprise a highly permeable, but relatively non-selective, support membrane that provides mechanical strength, coated with a thin selective layer of another material that is primarily responsible for the separation properties. Typically, but not necessarily, such a composite membrane is made by solution-casting the support membrane, then solution-coating the selective layer. Preparation techniques for making composite membranes of this type are well-known.

The membranes may be manufactured as flat sheets or as fibers and housed in any convenient module form, including spiral-wound modules, plate-and-frame modules, and potted hollow fiber modules. The making of all these types of membranes and modules is well-known in the art. Flat-sheet membranes in spiral-wound modules is the most preferred choice.

Membrane unit 212 may contain a single membrane module or bank of membrane modules or an array of modules. A single-stage membrane separation operation is adequate for many applications. If the permeate stream requires further purification, it may be passed to a second bank of membrane modules for a second processing step. If the residue stream requires further concentration, it may be passed to a second bank of membrane modules for a second-stage treatment. Such multi-stage or multi-step processes, and variants thereof, will be familiar to those of skill in the art, who will appreciate that the membrane separation step may be configured in many possible ways, including single-stage, multi-stage, multi-step, or more complicated arrays of two or more units in serial, parallel, or cascade arrangements.

Hydrogen-depleted stream 211 is typically compressed and is therefore at high pressure prior to being flowed across the feed surface of the membrane 213. The permeate side of the membrane is maintained at lower pressure to provide a driving force for transmembrane permeation. Carbon dioxide permeates the membrane preferentially, resulting in a permeate stream, 214, that is enriched in carbon dioxide as compared with feed stream 211, and a residue stream, 215, that is depleted in carbon dioxide as compared with feed stream 211. Typically, the feed side is maintained at a pressure within the range of about 15 bar to about 40 bar; preferably, within the range of about 20 bar to about 30 bar. The permeate side is typically maintained at a pressure within the range of about 1 bar to about 5 bar; preferably, within the range of about 1 bar to about 3 bar.

As is familiar to those of skill in the art, the separation performance achieved by the membrane depends on such factors as the membrane selectivity, the pressure ratio between feed and permeate sides, and the membrane area. The transmembrane flux depends on the permeability of the membrane material, the pressure difference across the membrane, and the membrane thickness.

Carbon dioxide-enriched permeate stream 214 is withdrawn from the permeate side of the membrane unit 212 and can be sent for further processing or environmentally friendly sequestration, as known in the art, or for some other use or disposal. This carbon dioxide-enriched stream can optionally be compressed and condensed to enhance the purity of the recovered carbon dioxide, as described below with respect to the process embodiment shown in FIG. 6.

Membrane residue stream 215 is withdrawn from the feed side of the membrane unit 212. Membrane residue stream 215 is then typically passed to a purge step, 216, to purge the gas of inerts such as nitrogen and argon. The inerts are removed as purge stream, 218, and the remaining gas stream, 217—containing mostly residual carbon monoxide, methane, hydrogen, and some carbon dioxide—is recycled back to the autothermal reformer 204. Depending upon the amount of inerts coming into the process, the purge step could be a continuous bleed or any type of separation process known in the art that is capable of removing inerts.

Figure 3:
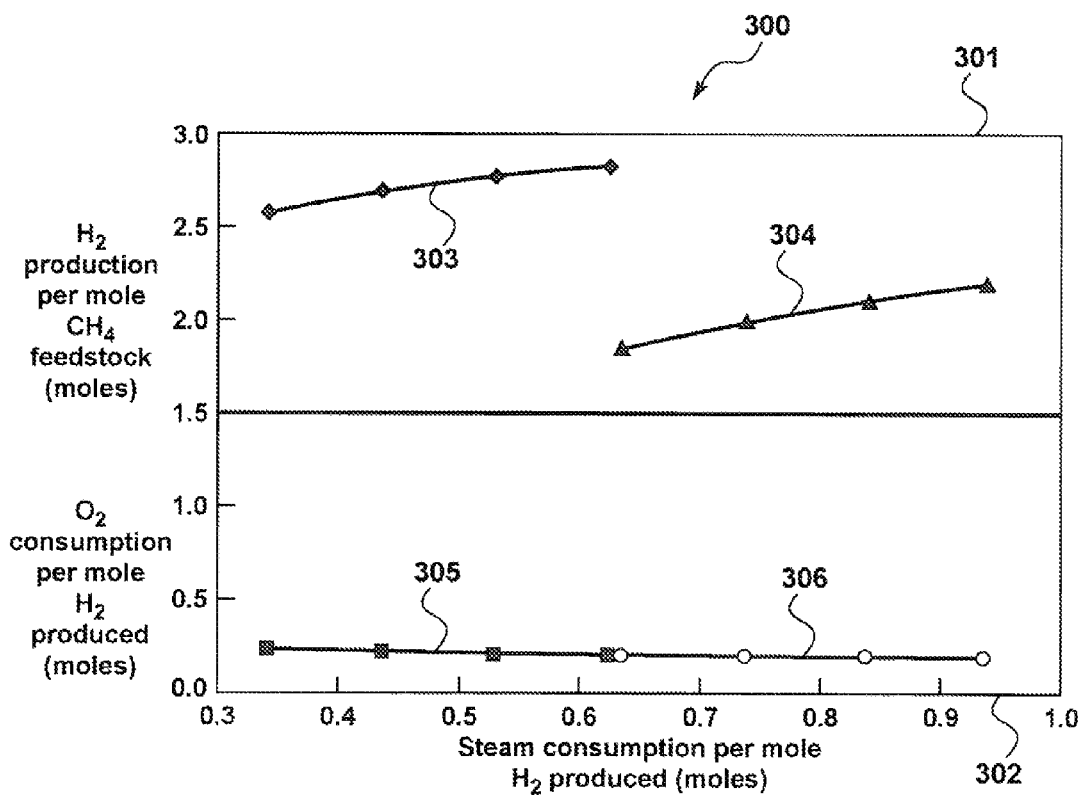
FIG. 3 is a plot comparing moles of hydrogen produced and moles of oxygen needed for conventional autothermal reforming and for the process of the invention.

FIG. 3 is a plot, 300, comparing both oxygen consumption and hydrogen production for the conventional process of FIG. 1 and the process of the invention in the embodiment of FIG. 2 (with recycle of gas from the membrane residue stream to the reformer). The plot shows two curves for hydrogen production, 304 (conventional) and 303 (the present invention), and two curves for oxygen consumption, 306 (conventional) and 305 (the present invention). The curves are plotted as a function of steam usage, expressed as the molar ratio of steam input to hydrogen output. Comparing the hydrogen output, curves 303 and 304, it may be seen that the conventional process plotted in curve 304 produces from about 1.8 to 2.2 moles of hydrogen per mole of methane, depending on the amount of steam used, whereas the process of the invention plotted in curve 303 produces over 2.5 moles of hydrogen per mole of methane. In other words, the hydrogen production is about 35% higher for the same amount of methane feedstock. In addition, the process of the invention requires the input of approximately 40% less steam than a conventional ATR process to produce the same amount of hydrogen. As can be seen by comparing curves 305 and 306, the oxygen consumption is about the same in the conventional and the new processes.

Figure 4:
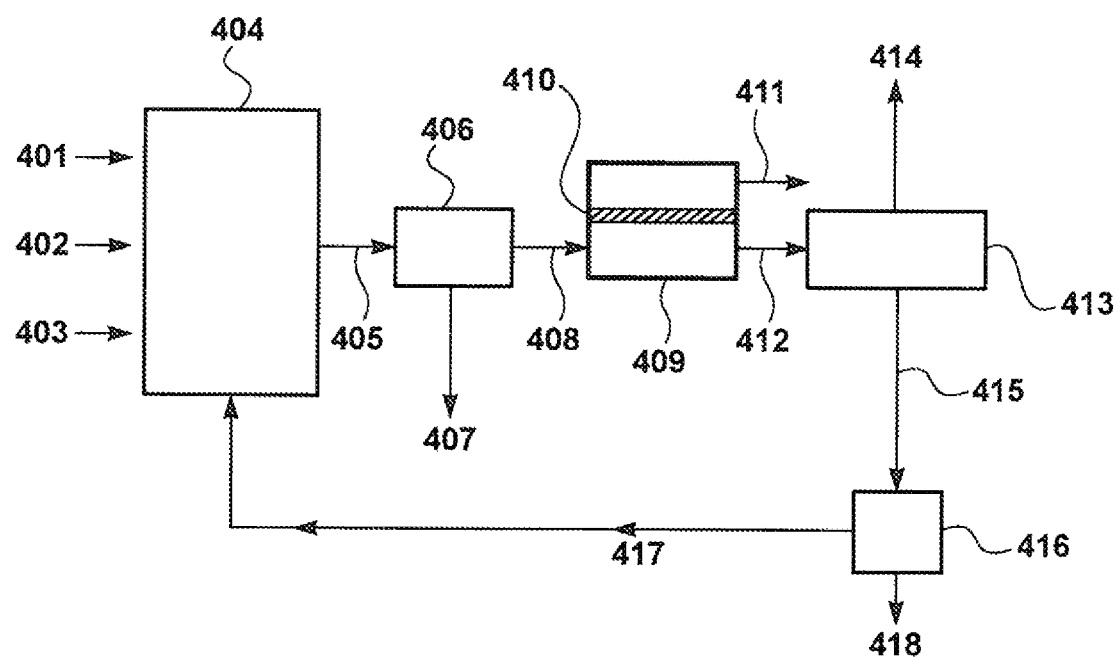
FIG. 4 is a basic process schematic for an alternative embodiment ATR process in accordance with the invention, which includes a membrane-based carbon dioxide recovery step followed by a hydrogen removal step, with recycle of the residual gas from the hydrogen removal step back to the autothermal reformer.

In an alternative embodiment of the inventive process, carbon dioxide is removed from the gas mixture first, followed by a hydrogen removal step. A process schematic for this embodiment is shown in FIG. 4.

Referring to the figure, natural gas, 401, steam, 402, and oxygen, 403, are introduced into an autothermal reformer, 404. The resulting gas, 405, comprising carbon dioxide, carbon monoxide, hydrogen, water vapor, and residual inerts is cooled in step, 406, to knock out water, 407. The resulting gas mixture, 408, is passed to a membrane separation unit, 409, that contains membranes, 410, that are selective to carbon dioxide over hydrogen, carbon monoxide, and methane. These membranes have the same properties as described above with respect to the process embodiment shown in FIG. 2.

Membrane feed stream 408 is typically compressed and is therefore at high pressure prior to being flowed across the feed surface of the membrane 410. The permeate side of the membrane is maintained at lower pressure to provide a driving force for transmembrane permeation. Carbon dioxide permeates the membrane preferentially, resulting in a permeate stream, 411, that is enriched in carbon dioxide as compared with feed stream 408, and a residue stream, 412, that is depleted in carbon dioxide as compared with feed stream 408. Feed and permeate pressures are typically in the ranges provided above with respect to the process embodiment shown in FIG. 2.

Carbon dioxide-enriched permeate stream 411 is withdrawn from the permeate side of the membrane unit 409 and can be sent for further processing or environmentally friendly sequestration, as known in the art, or for some other use or disposal. This carbon dioxide-enriched stream can optionally be compressed and condensed to enhance the purity of the recovered carbon dioxide.

Carbon dioxide-depleted membrane residue stream 412 is withdrawn from the feed side of the membrane unit 409 and passed to a hydrogen separation unit, 413, to separate hydrogen, 414, to produce a hydrogen product stream. Hydrogen separation unit 413 is typically a PSA unit, but may also be a membrane unit that contains membranes that are selectively permeable to hydrogen over carbon dioxide, as discussed above.

Hydrogen-depleted gas, 415, from the hydrogen separation unit is then typically passed to a purge step, 416, to purge the gas of inerts such as nitrogen and argon. The inerts are removed as purge stream, 418, and the remaining gas stream, 417—containing mostly residual carbon monoxide, methane, hydrogen, and some carbon dioxide—is recycled back to the autothermal reformer 404.

Figure 5:
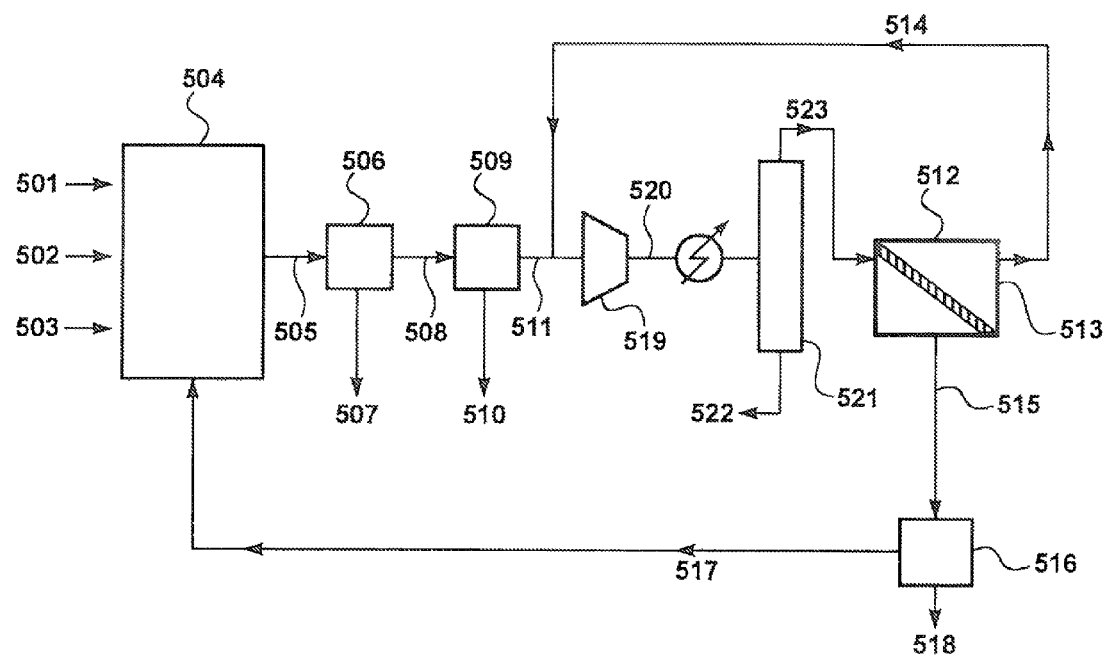
FIG. 5 is a process schematic for an ATR process in accordance with the invention, which includes a hydrogen removal step followed by a membrane-based carbon dioxide recovery step, with recycle of the membrane residue back to the autothermal reformer, and where the hydrogen-depleted gas mixture is compressed and condensed to produce a high-purity carbon dioxide product stream. The carbon dioxide-depleted overhead stream from the condenser is then passed across the feed side of the membrane. Carbon dioxide-enriched permeate from the membrane separation step is recycled back to the compressor suction to increase the carbon dioxide concentration in the condenser.

FIG. 5 shows a process schematic for an alternative embodiment of the process shown in FIG. 2. In the process embodiment shown in FIG. 5, the hydrogen-depleted gas mixture is compressed and condensed to produce high-purity carbon dioxide prior to passing across the feed side of the membrane.

Referring to the figure, natural gas, 501, steam, 502, and oxygen, 503, are introduced into an autothermal reformer, 504. The resulting gas, 505, comprising carbon dioxide, carbon monoxide, hydrogen, water vapor, and residual inerts is cooled in step, 506, to knock out water, 507. The resulting gas mixture, 508, is passed to a hydrogen separation unit, 509, to separate hydrogen, 510, to produce a hydrogen product stream. Hydrogen separation unit 509 is typically a PSA unit, but may also be a membrane unit that contains membranes that are selectively permeable to hydrogen over carbon dioxide, as discussed above.

Hydrogen-depleted gas, 511, from the hydrogen separation unit is then compressed in compressor, 519. Compressed stream, 520, is then sent to condenser, 521, to produce high-purity carbon dioxide product, 522. Overhead stream, 523—containing residual carbon dioxide, residual hydrogen, carbon monoxide, and methane—is passed to a membrane separation unit, 512, that contains membranes, 513, that are selective to carbon dioxide over hydrogen, carbon monoxide, and methane. These membranes have the same properties as described above with respect to the process embodiment shown in FIG. 2.

Membrane feed stream 523 is at high pressure prior to being flowed across the feed surface of the membrane 513. The permeate side of the membrane is maintained at lower pressure to provide a driving force for transmembrane permeation. Carbon dioxide permeates the membrane preferentially, resulting in a permeate stream, 514, that is enriched in carbon dioxide as compared with feed stream 511, and a residue stream, 515, that is depleted in carbon dioxide as compared with feed stream 523. Feed and permeate pressures are typically in the ranges provided above with respect to the process embodiment shown in FIG. 2.

Carbon dioxide-enriched permeate stream 514 is withdrawn from the permeate side of the membrane unit 512 and is recycled back to compressor 519.

Membrane residue stream 515 is withdrawn from the feed side of the membrane unit 512. Membrane residue stream 515 is then typically passed to a purge step, 516, to purge the gas of inerts such as nitrogen and argon. The inerts are removed as purge stream, 518, and the remaining gas stream, 517—containing mostly residual carbon monoxide, methane, hydrogen, and some carbon dioxide—is recycled back to the autothermal reformer 504.

Figure 6:
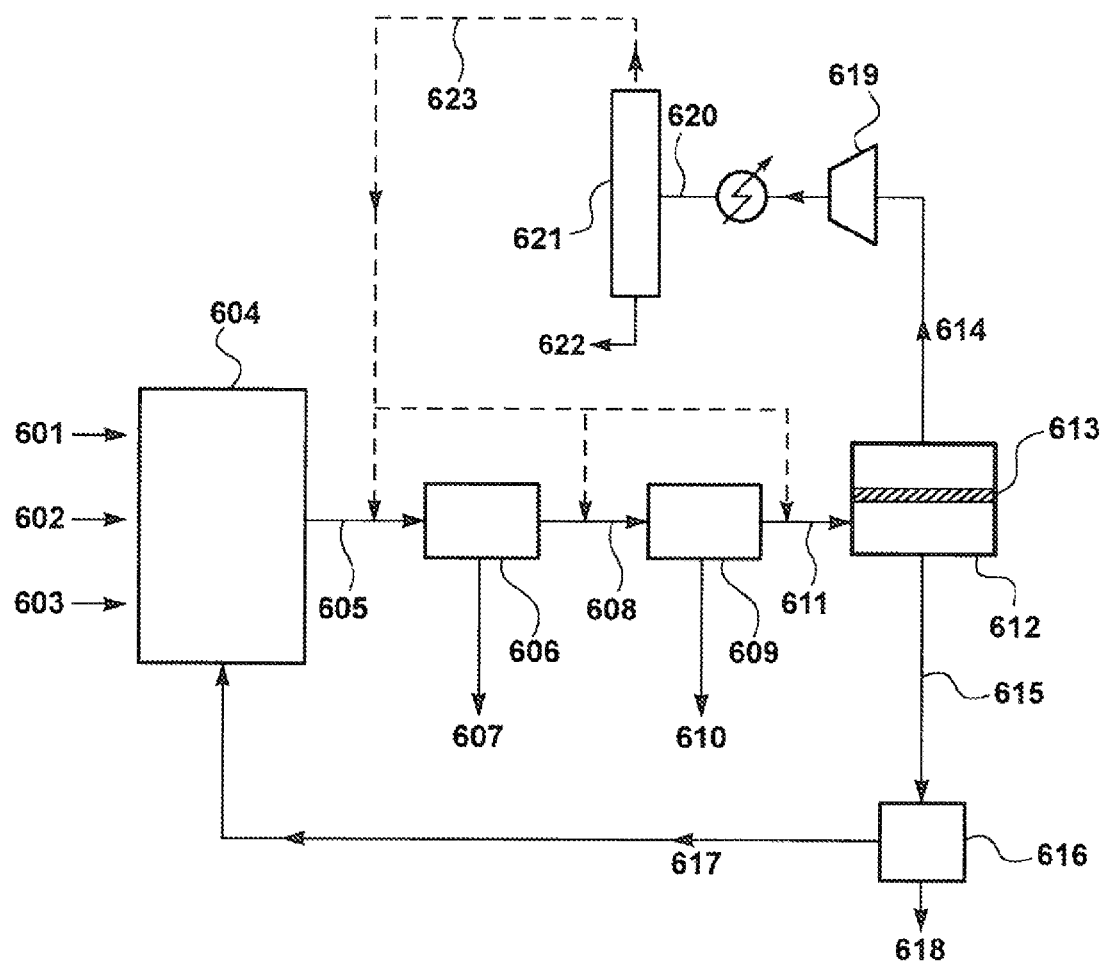
FIG. 6 is a process schematic for an alternative embodiment ATR process in accordance with the invention, which includes a hydrogen removal step followed by a membrane-based carbon dioxide recovery step, where the membrane permeate stream is compressed and condensed to produce a high-purity carbon dioxide product stream. The carbon dioxide-depleted overhead stream from the condenser may be recycled back to the process at various locations.

FIG. 6 shows a process schematic for an alternative embodiment of the process shown in FIG. 2. In the process embodiment shown in FIG. 6, the permeate stream is compressed and condensed to produce high-purity carbon dioxide.

Referring to the figure, natural gas, 601, steam, 602, and oxygen, 603, are introduced into an autothermal reformer, 604. The resulting gas, 605, comprising carbon dioxide, carbon monoxide, hydrogen, water vapor, and residual inerts is cooled in step, 606, to knock out water, 607. The resulting gas mixture, 608, is passed to a hydrogen separation unit, 609, to separate hydrogen, 610, to produce a hydrogen product stream. Hydrogen separation unit 609 is typically a PSA unit, but may also be a membrane unit that contains membranes that are selectively permeable to hydrogen over carbon dioxide, as discussed above.

Hydrogen-depleted gas, 611, from the hydrogen separation unit is then passed to a membrane separation unit, 612, that contains membranes, 613, that are selective to carbon dioxide over hydrogen, carbon monoxide, and methane. These membranes have the same properties as described above with respect to the process embodiment shown in FIG. 2.

Membrane feed stream 611 is typically compressed and is therefore at high pressure prior to being flowed across the feed surface of the membrane 613. The permeate side of the membrane is maintained at lower pressure to provide a driving force for transmembrane permeation. Carbon dioxide permeates the membrane preferentially, resulting in a permeate stream, 614, that is enriched in carbon dioxide as compared with feed stream 611, and a residue stream, 615, that is depleted in carbon dioxide as compared with feed stream 611. Feed and permeate pressures are typically in the ranges provided above with respect to the process embodiment shown in FIG. 2.

Carbon dioxide-enriched permeate stream 614 is withdrawn from the permeate side of the membrane unit 612 and compressed in compressor, 619. Compressed stream, 620, is then sent to condenser, 621, to produce high-purity carbon dioxide product, 622. Carbon dioxide-depleted overhead stream, 623—containing residual carbon dioxide, residual hydrogen, carbon monoxide, and methane—is withdrawn. As shown in the figure, this stream can be recycled to the process at a variety of locations, for example, upstream of the cooling step, 606; upstream of the hydrogen separation step, 609; and/or upstream of the membrane separation step, 612.

Membrane residue stream 615 is withdrawn from the feed side of the membrane unit 612. Membrane residue stream 615 is then typically passed to a purge step, 616, to purge the gas of inerts such as nitrogen and argon. The inerts are removed as purge stream, 618, and the remaining gas stream, 617—containing mostly residual carbon monoxide, methane, hydrogen, and some carbon dioxide—is recycled back to the autothermal reformer 604.

The invention is now further described by the following examples, which are intended to be illustrative of the invention, but are not intended to limit the scope or underlying principles in any way.

EXAMPLES

Example 1

Comparative Example-Production of Hydrogen Using a Conventional Autothermal Reforming Process (Not in Accordance with the Invention)

The calculations that follow were performed using a computer process simulation program (ChemCad 6.6, ChemStations, Houston, Tex.) which was modified with differential element subroutines for the membrane separation steps (as applicable).

The following calculation was performed according to the process schematic illustrated in FIG. 1, for production of hydrogen using a conventional ATR process. Results of the calculation are presented in Table 1.

TABLE 1

| | Parameter | | | Component (mol %) | | | | | |
|---|---|---|---|---|---|---|---|---|---|
| Stream | Total Flow (lbmol/h) | Temp. (° C.) | Pressure (bar) | Hydrogen | Water | Carbon Dioxide | Carbon Monoxide | $CH_4$ | Oxygen |
| Natural Gas Feed (101) | 3,402 | 30 | 27.8 | 0 | 0 | 0 | 0 | 100 | 0 |
| Steam Feed (102) | 5,000 | 250 | 27.8 | 0 | 100 | 0 | 0 | 0 | 0 |
| Oxygen Feed (103) | 1,300 | 30 | 27.8 | 0 | 0 | 0 | 0 | 0 | 100 |
| Reformer Product (105) | 13,934 | 520 | 22.1 | 47.0 | 28.6 | 6.1 | 13.8 | 4.6 | 0 |
| Shift Steam (106) | 1,000 | 250 | 27.8 | 0 | 100 | 0 | 0 | 0 | 0 |
| Shift Product (108) | 14,934 | 438 | 20.0 | 52.8 | 24.4 | 14.7 | 3.9 | 4.3 | 0 |
| Condensate (110) | 3,574 | 51 | 20.0 | 0.1 | 99.9 | 0.1 | 0 | 0 | 0 |
| PSA Product (113) | 7,104 | 51 | 20.0 | 99.9 | 0 | 0.1 | 0 | 0 | 0 |
| Tail Gas (114) | 4,256 | 51 | 2.1 | 18.5 | 1.7 | 51.3 | 13.5 | 14.9 | 0 |

Example 2

Process of the Invention-Production of Hydrogen by Autothermal Reforming with Carbon Dioxide Capture and Tail Gas Recycle The following calculation was performed according to the process schematic illustrated in FIG. 5, for production of hydrogen using an ATR process, with membrane-based carbon dioxide capture and recycle of the membrane residue stream to the autothermal reformer.

The membrane was assumed to have a carbon dioxide/hydrogen selectivity of 6.1 and a carbon dioxide permeance of 500 gpu. Membrane area was assumed to be 10,000 m². Results of the calculation are presented in Table 2.

TABLE 2

| Stream | Total Flow (lbmol/h) | Temp. (° C.) | Pressure (bar) | Hydrogen | Water | Carbon Dioxide | Carbon Monoxide | $CH_4$ | Oxygen |
|---|---|---|---|---|---|---|---|---|---|
| Natural Gas Feed (501) | 3,402 | 30 | 27.8 | 0 | 0 | 0 | 0 | 100 | 0 |
| Steam Feed (502) | 4,000 | 250 | 27.8 | 0 | 100 | 0 | 0 | 0 | 0 |
| Oxygen Feed (503) | 1,967 | 30 | 27.8 | 0 | 0 | 0 | 0 | 0 | 100 |
| Reformer Product (505) | 22,477 | 520 | 22.1 | 39.9 | 16.7 | 8.0 | 26.2 | 9.1 | 0 |
| PSA Feed (508) | 21,104 | 51 | 20.0 | 53.2 | 0.6 | 19.1 | 17.3 | 9.7 | 0 |
| PSA Product (510) | 9,066 | 51 | 20.0 | 99.0 | 0 | 0.1 | 0.2 | 0.7 | 0 |
| Membrane Feed (511) | 19,518 | −35 | 30 | 17.9 | 0 | 43.2 | 24.6 | 14.3 | 0 |
| Permeate Stream (514) | 10,735 | −35 | 2.1 | 11.6 | 0 | 70.0 | 10.8 | 7.5 | 0 |
| Residue Stream (515) | 8,783 | −35 | 29 | 25.5 | 0 | 10.4 | 41.3 | 22.7 | 0 |
| Recycle Stream (517) | 8,519 | 30 | 28 | 25.5 | 0 | 10.4 | 41.3 | 22.7 | 0 |
| Purge Stream (518) | 263 | 30 | 2 | 25.5 | 0 | 10.4 | 41.3 | 22.7 | 0 |

The mass balances in Examples 1 and 2 correspond to points on the FIG. 3 plot quantifying the benefits of the process of the invention, i.e., for the same gas feed, >30% more hydrogen production, and about 40% less steam consumption per kg of hydrogen produced.

We claim:

1. A gas separation process for production of hydrogen by autothermal reforming of natural gas, wherein the process comprises the following steps:
   (a) introducing natural gas, steam, and oxygen into an autothermal reformer, to produce a gas mixture comprising carbon dioxide, carbon monoxide, hydrogen, water vapor, and residual natural gas;
   (b) cooling the gas mixture to condense out water;
   (c) treating the resultant gas mixture to remove hydrogen, to produce a hydrogen product stream and a hydrogen-depleted gas mixture;
   (d) providing a membrane having a feed side and a permeate side, wherein the membrane is selective to carbon dioxide over hydrogen, carbon monoxide, and methane;
   (e) passing the hydrogen-depleted gas mixture across the feed side;
   (f) withdrawing from the permeate side a permeate stream that is enriched in carbon dioxide relative to the hydrogen-depleted gas mixture;
   (g) withdrawing from the feed side a residue stream that is depleted in carbon dioxide relative to the hydrogen-depleted gas mixture; and
   (h) passing the residue stream as a recycle stream back to the autothermal reformer as feedstock.

2. A process in accordance with claim 1, wherein the residue stream is treated to remove inerts prior to being passed as a recycle stream back to the autothermal reformer in step (h).

3. A process in accordance with claim 1, wherein step (c) comprises a pressure swing adsorption step.

4. A process in accordance with claim 1, wherein step (c) comprises a membrane-based separation step using membranes that are selectively permeable to hydrogen over carbon dioxide.

5. A process in accordance with claim 1, wherein the membrane has a selectivity to carbon dioxide over hydrogen of at least 6.

6. A process in accordance with claim 5, wherein the membrane has a selectivity to carbon dioxide over hydrogen of at least 10.

7. A process in accordance with claim 1, wherein the membrane has a carbon dioxide permeance of at least about 200 gpu.

8. A process in accordance with claim 1, wherein the hydrogen-depleted gas mixture is compressed and condensed to produce high-purity carbon dioxide prior to being passed across the feed side of the membrane.

9. A process in accordance with claim 1, wherein the carbon dioxide-enriched permeate stream is compressed and condensed to produce high-purity carbon dioxide.

10. A process in accordance with claim 1, wherein the process results in the production of at least 20% more hydrogen than a conventional autothermal reforming process.

11. A gas separation process for production of hydrogen by autothermal reforming of natural gas, wherein the process comprises the following steps:
   (a) introducing natural gas, steam, and oxygen into an autothermal reformer, to produce a gas mixture comprising carbon dioxide, carbon monoxide, hydrogen, water vapor, and residual natural gas;
   (b) cooling the gas mixture to condense out water;
   (c) providing a membrane having a feed side and a permeate side, wherein the membrane is selective to carbon dioxide over hydrogen;
   (d) passing the gas mixture across the feed side;
   (e) withdrawing from the permeate side a permeate stream that is enriched in carbon dioxide relative to the gas mixture;
   (f) withdrawing from the feed side a residue stream that is depleted in carbon dioxide relative to the gas mixture;
   (g) treating the residue stream to remove hydrogen, to produce a hydrogen product stream and a hydrogen-depleted gas stream; and
   (h) passing the hydrogen-depleted gas stream as a recycle stream back to the autothermal reformer as feedstock.

12. A process in accordance with claim 11, wherein the hydrogen-depleted gas stream is treated to remove inerts prior to being passed as a recycle stream back to the autothermal reformer in step (h).

13. A process in accordance with claim 11, wherein step (g) comprises a pressure swing adsorption step.

14. A process in accordance with claim 11, wherein step (g) comprises a membrane-based separation step using membranes that are selectively permeable to hydrogen over carbon dioxide.

15. A process in accordance with claim 11, wherein the membrane has a selectivity to carbon dioxide over hydrogen of at least 6.

16. A process in accordance with claim 15, wherein the membrane has a selectivity to carbon dioxide over hydrogen of at least 10.

17. A process in accordance with claim 11, wherein the membrane has a carbon dioxide permeance of at least about 200 gpu.

18. A process in accordance with claim 11, wherein the gas mixture is compressed and condensed to produce high-purity carbon dioxide prior to being passed across the feed side of the membrane.

19. A process in accordance with claim 11, wherein the carbon dioxide-enriched permeate stream is compressed and condensed to produce high-purity carbon dioxide.

20. A process in accordance with claim 11, wherein the process results in the production of at least 20% more hydrogen than a conventional autothermal reforming process.

* * * * *